Sept. 20, 1949.  H. C. WALLACE  2,482,723
GRAIN BLOWER

Filed April 29, 1946  5 Sheets-Sheet 1

Inventor
H. C. Wallace
By Kimmel & Crowell
Attorneys

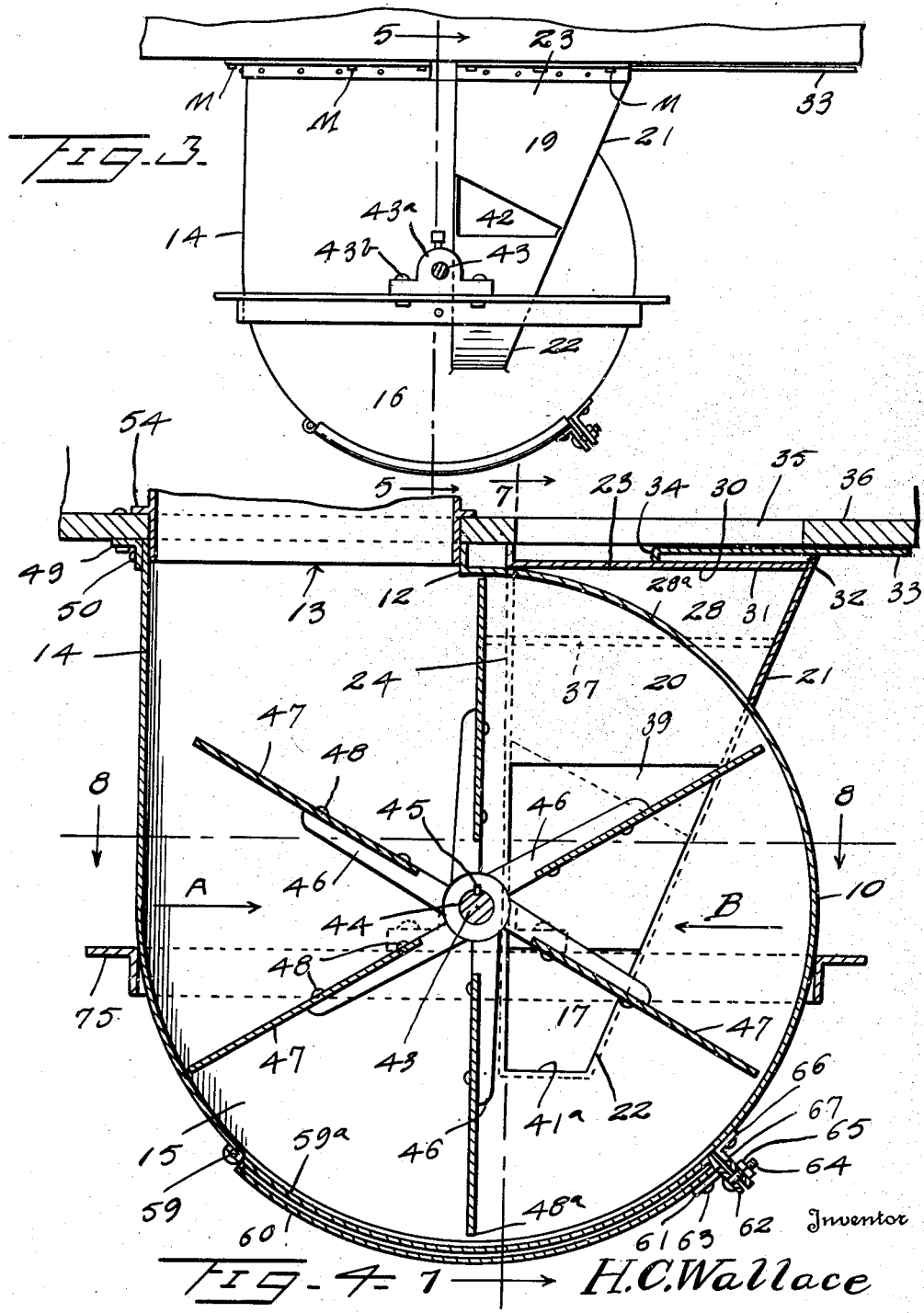

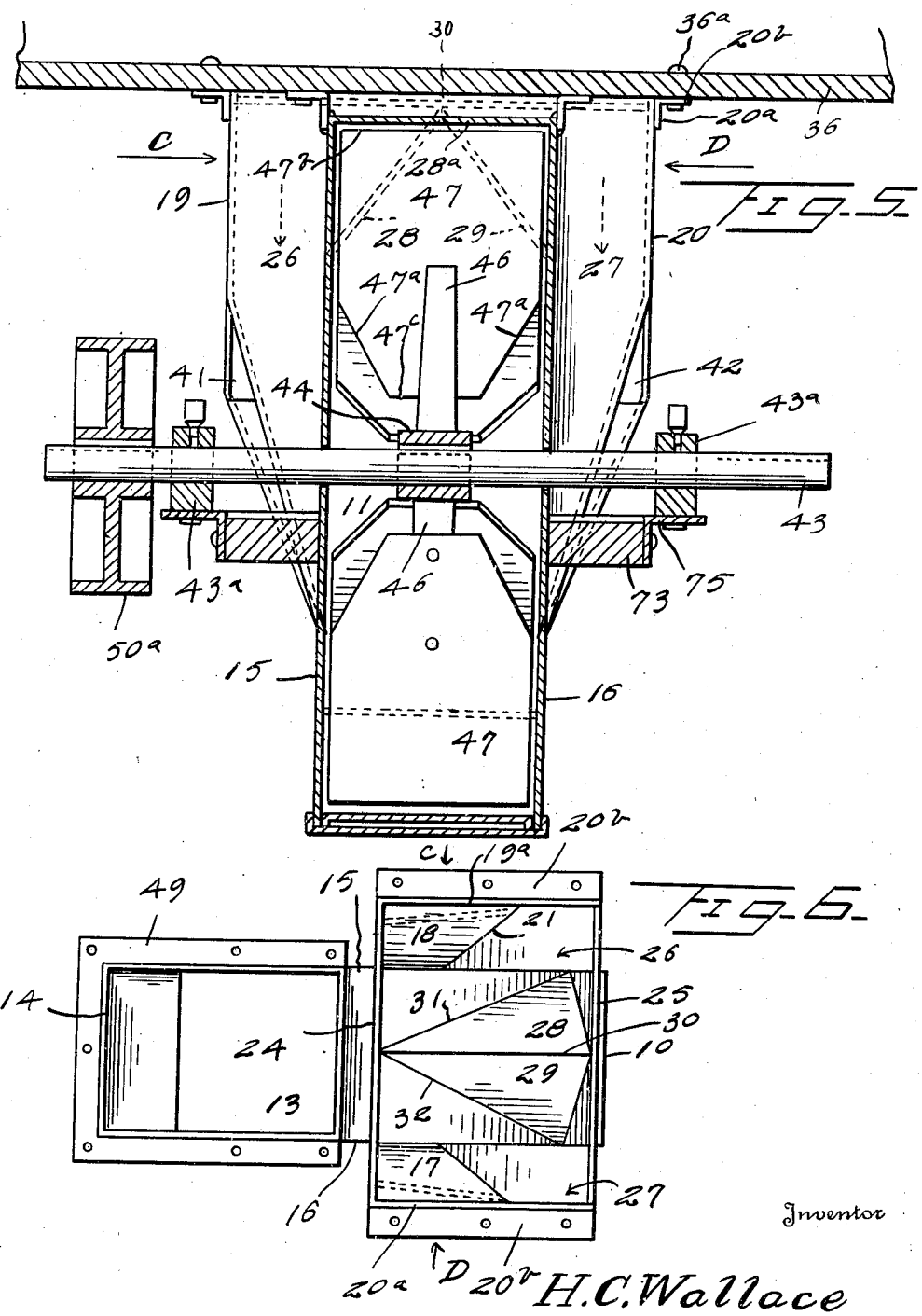

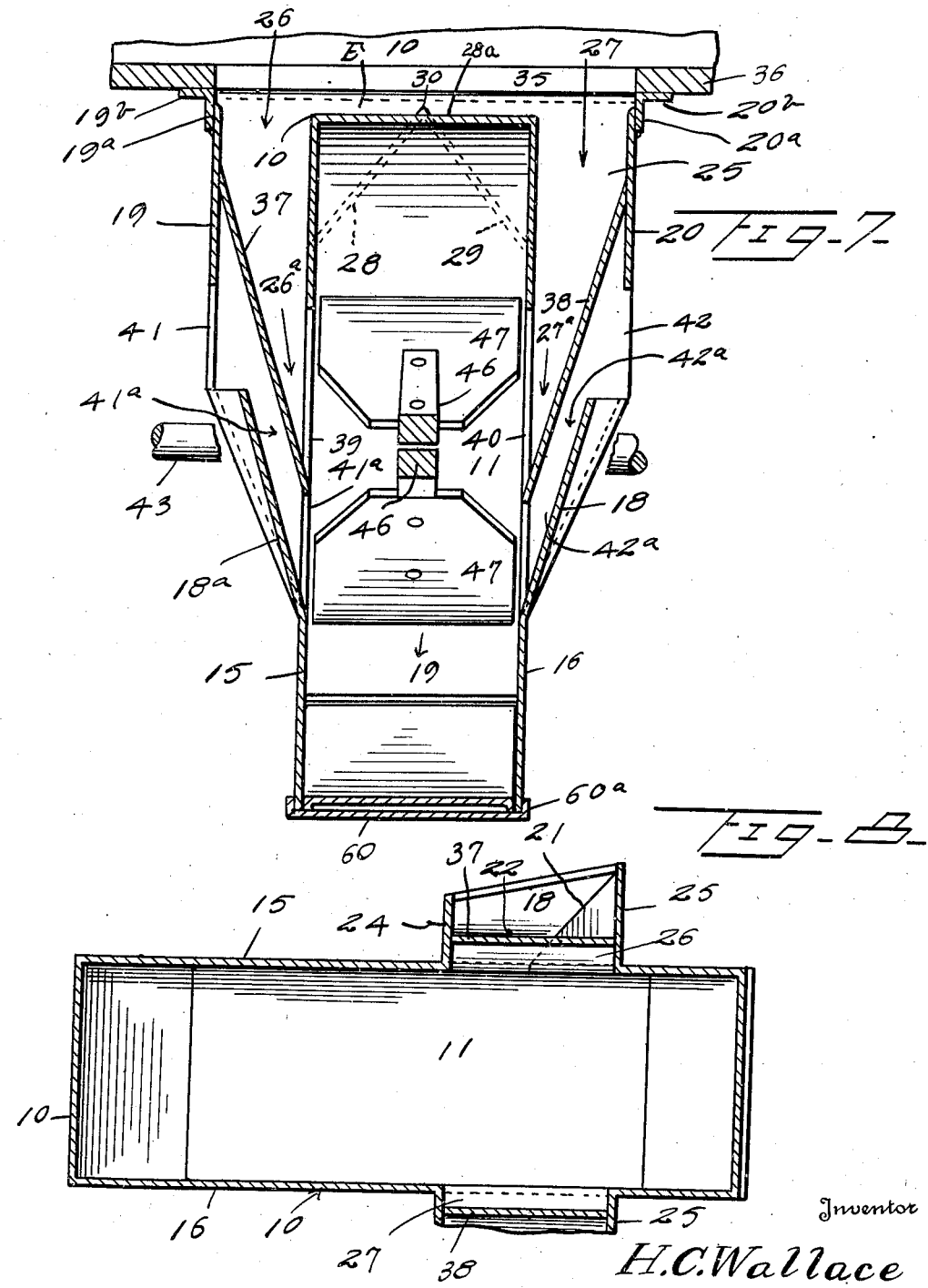

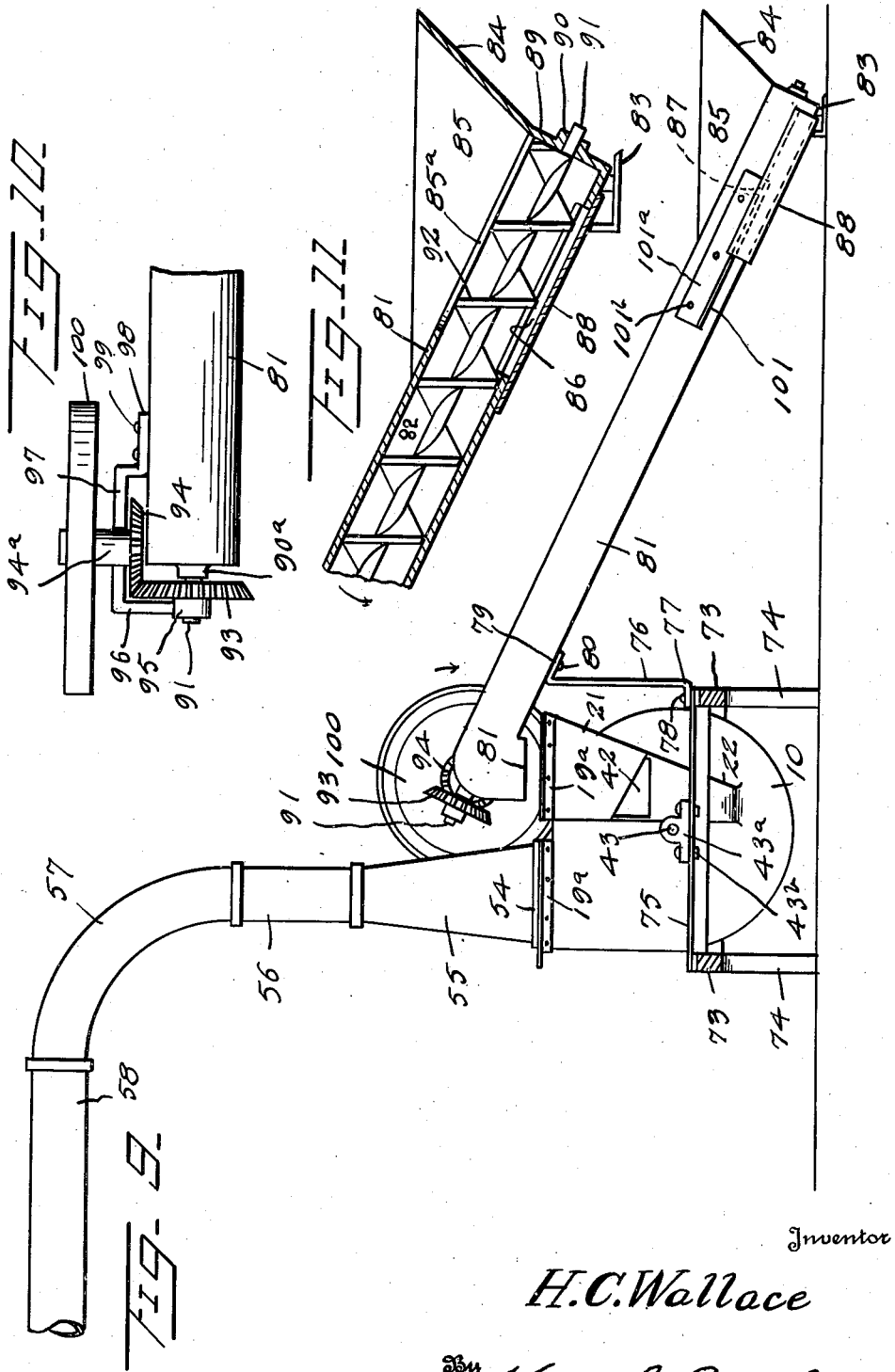

Patented Sept. 20, 1949

2,482,723

UNITED STATES PATENT OFFICE 2,482,723

GRAIN BLOWER

Halbert C. Wallace, Fargo, N. Dak.

Application April 29, 1946, Serial No. 665,763

2 Claims. (Cl. 302—37)

The present invention relates to improvements in grain elevators and more particularly to a pneumatic grain elevating apparatus.

One of the objects thereof is to provide a simple, efficient and inexpensive device adapted to receive grain thereinto and by the application of an air-cushioning forced air draft to the grain, effect its carriage upwardly through the machine into a discharge chute.

Another object thereof is to provide a grain elevating apparatus in which the desirable characteristics of sturdiness, reliability, compactness and lightness are found.

A further object thereof is to provide a grain elevating apparatus in which a blast of air is made use of in accomplishing the lifting action of the grain, in such a manner that an air cushion is already formed upon which the grain is received before air pressure carries the grain out of the receptacle.

Another object thereof is to provide a grain elevating apparatus which is adapted to lift a steady charge of grain deposited into the machine, in such a manner as not to injure any part thereof due to violent impact therewith.

Another object thereof is to provide a grain elevating apparatus which is so shaped, constructed and arranged that a relatively small, light blower fan may be caused to progressively receive, position and carry away, in a blast of air passing out of the apparatus, the grain deposited into the latter.

A still further object is to provide means for pneumatically discharging grain from a grain receiving receptacle into a delivery chute in which use is made of a principle of assembly of blower fan and grain and air delivering instrumentalities which assures proper positioning of the grain in the receptacle so that acted upon by the blades of the blower fan, the deposited grain may not only be thrown towards the bottom of the device, but lifted in a blast of air into the delivery chute on an air cushion that keeps separated the valuable grain fibers and prevents crushing or mutilation of any part thereof.

Another object thereof is to construct a grain elevating apparatus, consisting of a blower casing and grain discharge chute leading from its upper zone, in such a manner that one hemisphere of the cylindrical blower casing is devoted to depositing the grain therein by gravity before subjected to the action of a blast of air by the blades of the blower fan, while the other hemisphere of the casing is devoted entirely to supporting the grain lifting action of the blast of air generated by the fan blades during rotation of the blower fan in the casing. As a result of this separation of loading and discharging zones for the deposited grain, it is possible to locate the air intake which supplies air in the casing to support the blast of air therein contiguously to the lower part of the apparatus. This imposes upon the fan blades operating in the first named hemisphere of the fan casing only the function of receiving a continuous deposit progressively, of grain, and throwing the same downwardly towards the bottom of the casing to a point where preceding fan blades have already created an air cushion for same, due to traversing the air intake of the casing. Depositing of the grain by certain fan blades upon the air cushion made by other fan blades takes place successively in one hemisphere of the casing, so that the fan blades moving upwardly in the other hemisphere perform the duty of blowing out the air-cushioned grain with untrammeled efficiency.

Another object thereof is to provide, in a device of the kind described, improved hopper means designed along lines that assure depositing into the central part of the blower casing, from opposite sides thereof at the same time, and in substantially the same measure, under influence of gravity, the grain supplied to the hopper means so no part of the device can become unduly clogged or hampered in function.

A further object thereof is to provide, in a device of the kind described, improved hopper means by virtue of which it is provided with a mouth that extends slightly above the top peripheral surface of the blower casing, to be supplied with grain by said hopper means. The arrangement of the mouth of the hopper means, whereby it intersects the cross-sectional area of the blower casing, causes it to have oppositely arranged grain introducing parts opening into opposite sides of the blower casing, and at the same time co-operates with oppositely inclined baffle plates located in its mouth, which extend downwardly into the body of the hopper means. The consequence of such arrangement is, that the grain delivered into the mouth of the hopper means is evenly divided by such baffle plates so that half is sent down into the center of the interior thereof from one side of the casing, and the other half sent down into the center of the interior of the casing from the other side, so that the blades of the blower fan receive grain evenly distributed transversely thereof.

A final object thereof is to provide, in a device of the kind described, oppositely arranged grain delivering hoppers which introduce grain into the center of the blower casing from opposite sides thereof, and which also introduce outside air into the casing at a point below the point of admission of the grain into the casing. To assist gravity in moving the grain automatically down the hoppers without clogging same, each hopper tapers vertically from top to bottom transversely of the sides of the casing, as well as in a plane at right angles thereto. To assist the fan blades in their air-cushioning function in connection with the grain admitted by these hoppers, they are located to one side of the vertical medial line of the blower casing so as to discharge air into the bottom of the casing in a downward stream to a point where the fan blades form the air cushion.

With the above and other objects in view, my invention consists in the combination, arrangement and details of construction disclosed in the drawings and specifications and then more particularly pointed out in the appended claims.

In the drawings wherein similar reference characters designate similar parts throughout the respective views, Figure 1 is a side elevation of my invention shown mounted upon a grain delivering vehicle, Figure 2 is a bottom plan view of the vehicle shown in Figure 1, parts being broken away.

Figure 3 is a side view of my invention somewhat enlarged,

Figure 4 is a vertical sectional elevation of my invention,

Figure 5 is a cross sectional elevation of my invention, taken on line 5—5 of Figure 3.

Figure 6 is a top plan view of my invention,

Figure 7 is a cross-sectional elevation taken on line 7—7 of Figure 4,

Figure 8 is a longitudinal section taken on line 8—8 of Figure 4,

Figure 9 is a side elevation of my invention equipped with a conveyer system for loading it with grain laying loosely upon the floor of a building or the ground, Figure 10 is a detail view, in top plan, of gearing for driving an auger feed in a conveyor system, and Figure 11 is a fragmental detail view showing the auger grain feed.

Figures 1, 2:
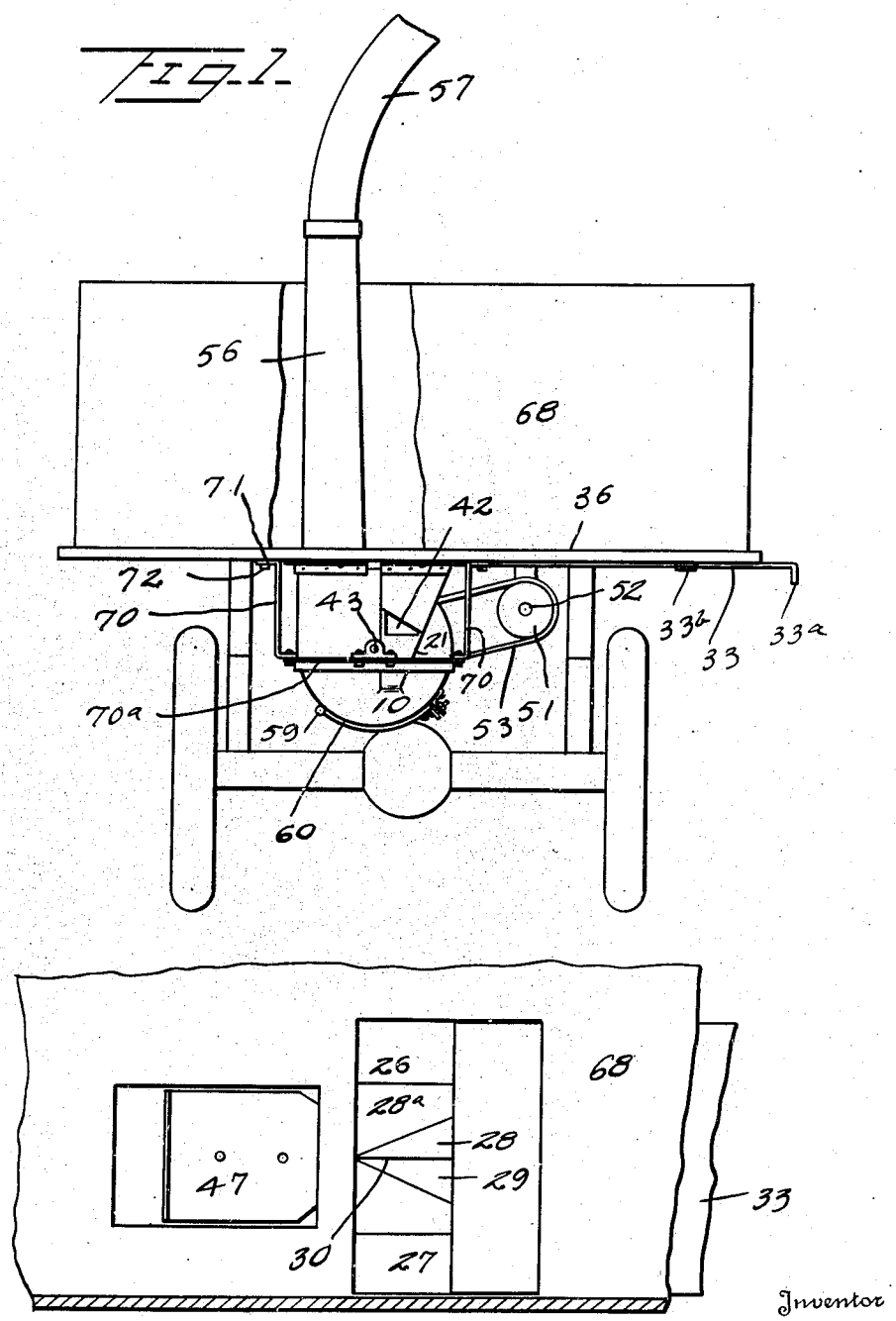

Referring to the drawings, which are merely illustrative of my invention, the various parts thereof are disclosed. The present invention consists of a specially shaped blower casing with reference to the hopper means employed to introduce grain into the casing; a specially shaped hopper, and various arrangements for mounting it upon, or with reference to, a source of grain supply.

The blower casing is cylindrical in configuration, designated 10, and the hollow interior thereof is indicated at 11. At the top of the casing, in the left vertical hemisphere thereof, indicated by the arrow A in Figure 4, it is formed with the grain discharge opening 13, a nipple formation 12 being here provided upon it, to connect to the discharge chute hereinafter described. The casing 10, in hemisphere A thereof has a perpendicular wall 14 disposed in axial alignment with nipple 12.

The means for depositing grain into the apparatus is so constructed and arranged relatively to the blower casing 10 that it is intended to taper from top to bottom, not only transversely of hemisphere B of the casing shown in Figure 4, but in a plane at right angles thereto at its lower plane, as shown in Figure 7. Reference will also be made to Figure 6 which shows a top plan view of the grain depositing means. From Figure 6 it is seen that the cross-section of each of the hoppers C and D denoted in Figure 6, which are arranged on opposite sides 15 and 16 of the casing 10, is rectangular. The two hoppers C and D have a common mouth E denoted in Figure 7. This mouth E of the grain depositing means is formed by means of the oppositely spaced apart parts 24 and 25 of opposing walls of each separate hopper as is illustrated in Figure 6, which extend above the top peripheral surface of the blower casing 10 as is shown in Figure 4. In Figure 4 it is seen that the lower end of these hoppers extend, as at 17, to a point below the center of the casing 10.

The downwardly extending taper of the outer end wall of each hopper is broadly designated 18 in Figure 8. This outer shell or wall of the hopper C or D is designated 19, 20 respectively. The upper part thereof, as shown in Figures 5 and 7, is disposed parallel to side wall 15 or 16 of the casing 10. The lower part thereof, at 18, 18a respectively, inclines downwardly and inwardly so as to be closed at the lowermost extremities of the hoppers against the adjacent surfaces of the casing 10. The downwardly extending taper of the hoppers C or D, as far as its position transversely of the hemisphere B of the casing is concerned, is shown in Figure 4, where it is seen that its wide part 21 is at its upper end and its narrow part 22 is at its lowermost end. Figure 8 also discloses this taper in top plan, as does Figure 6. The upper parts of the hoppers, in the zone of their common mouth E (Figure 7), is attached by means of angle irons to the bottom of a grain loading body, the vertical webs of the angle irons 19a, 20a, being attached to the sides 19, 20 of the hoppers, while the horizontal parts 19b, 20b, are attached to the grain loading body. In Figure 3 it is seen that the upper part 23 of each hopper is in the same plane with the discharge end of the blower casing 10, while their lower ends 22 project below the lowest point of the discharge means for grain out of the casing into the grain receiving chute.

In Figure 6 it is seen that grain entry compartments 26 and 27 are provided by the hoppers laterally of the casing 10, this being also shown in Figure 7 where these compartments are shown to communicate with the mouth E which is common to both hoppers C and D. These compartments are also formed in a plane with the top peripheral surface 28a of the drum or casing 10 shown in Figure 4. For the purpose of evenly dividing the charge of grain delivered into the mouth E of the apparatus, a pair of oppositely extending baffle plates 28, 29 are provided at the upper plane of the casing 10. These baffle plates 28, 29 connect at their apex 30. Their shape is best seen in Figure 4, being triangular, with a curved outline for the hypothenuse thereof. This is produced because the lower edges of these plates coincide with the adjacent arc 28a of the top peripheral surface of the casing 10. Their rear walls form the angular topmost ends of walls 19, 20 of the hoppers, while their top is the apex edge 30 shown in Figure 7. The oppositely extending baffle plates 28 and 29 incline in opposite directions as shown in Figure 7, so as to diverge downwardly. Their apex ridge 30 is exactly at the center of the casing 10. From this arrangement of baffle plates 28, 29, with relation to the mouth E of the hopper, it is seen that the grain introduced into this mouth of the apparatus is evenly divided and caused to slide down these baffle plates down into the hoppers under influence of gravity. It may be found desirable to close the mouth E of the apparatus. In Figure 4 is shown one of two tracks 31 provided at opposite points of the hopper upon walls 19 and 20 thereof, to support the opposite marginal parts of a slidable gate 33 which is horizontally disposed at the uppermost part 32 of the mouth E, upon which it bears at one point as it slides, and by which it is raised slightly above the tracks 31, thereby requiring formation of the lip 34 on the gate 33 which supports the gate upon the tracks 31.

The grain delivering body has a grain entry slot 35 formed therein upon its bottom member 36, as shown in Figure 4. In order to guide and direct the grain entering from slot 35 into both hoppers C and D by reason of baffle plates 28, 29, so that the grain is, under influence of gravity, deposited at the proper places inside of the casing for air-cushioning by the blades of the blower fan therein, I provide oppositely arranged, downwardly extending diagonally disposed baffle plates 37 and 38 respectively. In Figure 7, it is seen how their inner ends are secured against parallel walls 19, 20 of the hoppers C and D, while their lowermost ends are secured to the walls 15 and 16 on opposite sides of the casing 10. These walls 15 and 16 of the casing 10 are formed centrally with vertical slots 39, 40 respectively. The lower ends of baffle plates 37, 38 coincide with walls 15 and 16 across the full width of vertical slot 39 or 40 of casing 10, in such a manner that the major portion of the length of the slots extends above the lower parts of baffle plates while the minor portions of the slots extend below the baffle plates to provide air admission ports 41a and 42a here, as shown in Figure 7. The lower ends of baffle plates 37, 38 are slightly below the center or axis of rotation of the blower fan in the casing 10, and they cause grain admission ports or passages to exist at the upper planes of vertical slots 39, 40 centrally of the casing 10. The lower parts of the parallel walls 19, 20 of the hoppers C and D are formed with air intake ports 41 and 42. The downwardly inclining baffle plates 37, 38 and walls 18, 18a, of the hoppers provide between themselves diagonally disposed air passageways 41a and 42a which open out into air intake ports 41, 42. 26a and 27a denote the gravity course followed by the grain passing through the hoppers enroute to the blades of the blower fan.

The blower fan has a snug rotary fit in the casing 10. In Figure 4 it is seen that a shaft 43 passes through the center of the cylindrical casing 10, through the side walls 15, 16 thereof, laterally of the inner perpendicular walls 24 thereof, which has opposing parts journaled in bearings 43a operatively fixed in position upon the apparatus equipped with my invention. A spider is made fast by its collar 44 and spline 45 engaged therewith upon shaft 43. A circumferentially extending series of radially disposed arms 46 of the spider have the inner parts of flat blades 47 secured thereupon by means of the fasteners 48. The blades are free to sweep along with their outer edges the inner circumference of the casing 10. Shaft 43 is rotated in a clockwise direction as will hereinafter appear. It is provided, exteriorly of the casing, with a drive pulley 50a.

From Figure 4, it is seen that the grain discharge chute may have its usual bottom flange 54 abutting the top of the member 36. The horizontal flanges 49 of the rectangular angle iron frame seat against the bottom of the member 36. The vertical flanges 50 are fitted around nipple 12 of the casing 10. A belt 53 (Figure 1) is trained over pulley 50a on shaft 43, and also upon a pulley 51 made fast upon a shaft 52 operatively mounted in position upon the apparatus equipped with my invention. This grain discharging chute usually is made up in sections, such as the upright section 55 directly carrying out the grain from casing 10, upright section 56 coupled onto section 55 at its lower end, and to a curved chute section 57 at its upper end, with a horizontally deflected chute section 58 leading laterally of the grain elevator.

For the purpose of giving access into the interior 11 of casing 10, without disturbing the relationship of any of the parts of the present apparatus, a door 60 is provided, shown in Figure 4. It is of arcuate formation, having its inner part operatively hinged at 59 to the casing 10. It is designed to close an opening 59a formed at the bottom of casing 10. The opposite end of the door 60 has a flange 61 of an angle iron secured by fasteners 63 thereto, the other right angular flange thereof, 62, having a hole into which is passed a screw bolt 64 carried by a flange 67 of an angle iron which has a right angular flange 66 attached to the casing 10. The bolt 64 passes into flange 67, and flange 62, with its head abutting flange 62 so that a nut 65 threaded upon this bolt may be clamped against flange 67 and in this manner hold the door 60 closed.

Various ways exist in which it may be found desirable to mount my invention, depending upon the situation in which it is to be used. Thus, in Figure 1, it is shown attached to the bottom of the loading truck 68 whose bottom connection to the mouth E of the apparatus is shown in Figure 4, the bottom of the vehicle being denoted at 36. For the purpose of regulating the introduction of grain from inside of the truck 68, before it enters the blower casing 10, slide gate 33, already described, has been supplied, which carries an operating handle 33a. My apparatus is attached relatively to this vehicle by aid of a hanger, the opposing vertical strap iron arms 70 of which have outturned flanges 71 which are attached by fasteners 72 to the under side of the truck body 36. Upon the horizontally extending part of this hanger, 70a, carried by arms 70, is operatively secured the bearing for the shaft 43 of the blower fan.

It may be desirable to arrange for a mounting of my invention in connection with use of the machine with an auger conveyer, resting upon the floor of a building, or else upon the ground, for transferring a load of grain here upwardly into the mouth of the machine. This is shown in Figures 9, 10 and 11. In the construction here shown a complete grain delivering machine is disclosed, consisting of means for moving grain upwardly into the machine, and means for lifting the grain out of the machine into a grain chute extending upwardly from the machine.

The machine is mounted upon a sub-structure frame composed of the corner legs 74 which support a rectangular frame having bars 73 connected to the upper ends of the legs 74. Operatively secured upon the frame at 75 is the bearing 43a secured by fasteners 43b thereto centrally. This makes a strong pedestal for surmounting the blower casing rigidly, with its superimposed grain discharge chute. A post 76 has its lower end angularly disposed, as at 77, being secured by fasteners 78 upon the beam 75 upon which bearing 43a is also mounted. The upper part of this post 76 has an angular lug 79 which is secured by fasteners 80 directly to the chute 81 which extends downwardly from the machine. Chute 81 rests with a lowermost foot 83 upon the ground or else upon the floor of a building. Its upper end is formed with a vertical depending spout 81a for discharging grain directly into the mount E of the machine.

Chute 81 is preferably a tubular body whose bore is denoted at 82. It is closed at its lowermost end as at 89, which part has a nipple 90 acting as a bearing for one end of a shaft 91 which extends longitudinally upwardly into the chute 81. A suitably shaped hopper 84 has inclining walls 85 that direct grain into the chute 81 through its upper opening 85a. This chute is designed also to pick up grain shoveled or otherwise, present in the vicinity of its lower opening 86. This opening 86 is adapted to be closed when the chute 81 is not in use, by means of a closure member 88. This closure member has oppositely arranged outturned flanges 87 formed on its oppositely curving sides which overlap the oppositely curving sides of the chute. These flanges slidably ride upon outturned flanges 101 formed upon side plates 101a secured by bolts 101b to opposite sides of the chute. The closure member 88 hangs upon flanges 101 slidably with its bottoms slidably engaging the bottom of the chute. It may thus be slid along the chute upon flanges 101 to cover or uncover the lower opening 86 of the chute. Member 88 has a toe 83 adapted to rest the lowermost end of the chute on.

Shaft 91 carries an auger 92 whose several vanes extend upwardly from end to end of the chute 81. Chute 81 is formed at its upper end with a nipple or shaft bearing 90a through which the free end of shaft 91 extends. Made fast upon this shaft 91 in advance of the bearing 90a is a miter gear which meshes with a similar gear 94 mounted in a bearing 94a formed on a bracket member 97 having an offset flange 98 overlying the chute and secured thereto by fasteners 99. Shaft 91, in advance of miter gear 93 is also received in a bearing 95 carried by the right angular arm 96 of the bracket member 97. On the shaft carrying miter gear 94 is a pulley 100 for driving this miter gear.

The use and operation of my invention is as follows. From whichever type of delivery apparatus the grain is to be delivered into mouth E of the blower casing 10, when the grain enters this mouth through the effective area thereof in a steady line of passage into the machine, the grain therein will be evenly divided when it falls upon the oppositely inclined baffle plates 28 and 29. The motor has been set in rotation in the casing 10, and the fan therein is rotating steadily. Since the blades of this fan move downwardly in the vertical right hemisphere B of the casing 10, while they move upwardly in the left vertical hemisphere thereof, and since the air intake openings 41a and 42a are located at the bottom of the casing, there is no appreciable down draft of air in the right hemisphere of the apparatus, so no retarding influence exists at the mouth of the latter against a gravity feed of the grain down into passages 26a, 27a of the hoppers C and D. Due to the fact that the hoppers taper and converge downwardly, the grain sliding down the inside baffle plates 37 and 38, and down the inclined walls of the hoppers effect an easy entrance into the central zone of the interior of the casing 10 as same emerge through grain admission ports 39, 40. The grain will thus be deposited on both opposite sides of the casing 10 at the same time, and will, under influence of gravity, move transversely inside of the casing, falling upon the blades of the fan in an evenly measured quantity. The moment the fan blades 47 of the blower fan impinge against the grain thus deposited centrally in said casing 10, they set to throw the grain in a loose state down into the bottom of the casing, as the blades successively make a traverse vertically of the grain admission ports 39, 40.

While this is taking place, while the grain in two divided charges is coming down the hoppers into the casing, certain blades of the fan which is rotating clockwise, have already, in advance of the falling grain, pushed or thrown by preceding fan blades, traversed vertically the zone of the air admission ports 41a, 42a of the casing, in moving downwardly. As the fan is rotating fast, an air cushion is created opposite the falling grain and in the path of movement thereof to the bottom of the casing 10. Upon this air cushion falls the grain, and now the blast of air created by the blades of the fan in the left vertical hemisphere of the casing, moving upwardly therein, is effective to lift the air-cushioned grain upwardly in this hemisphere and out of the casing 10 into the discharge chute of the machine made up of sections 55, 56, 57, 58, etc. as shown in Figure 9.

The grain reaching the lower part of the casing 10 necessarily undergoes contraction in bulk due to the tapering construction of the hoppers, but the air intake ports 41a, 42a also taper so that the air entering the casing from the entrance ports 41, 42 disposed centrally of the machine, takes a diagonally downward course from outside the hoppers directly to the bottom of the inside of the casing. Air is thus injected under some degree of pressure caused by the fan blades in rotation, and due to the suction created by the upwardly moving blades of the fan in advance of the discharge points of the incoming air. Therefore, air is scooped up by the blades just leaving downwardly moving and about to enter upwardly moving positions. This air is distributed among the particles of grain individually in such a manner that these particles are nicely separated and ride with the air cushion support upwardly out of casing. The blast of air is strong enough to lift the light particles to a high level above the machine in the grain discharge chute so that when the grain emerges out of the outlet of this chute it may be deposited upon a given floor or a building.

Where the auger is used to fill the machine at its top with grain, pulley 100 is set in motion, which rotates the auger. An operator may shovel grain into the top hopper 84 of the machine, or shovel same along the ground into the bottom opening 86 thereof, or else the operator of the machine can so set the pedestal supporting the blower casing as to cause grain automatically to bear down by gravity adjacent opening 86, so the suction created by the rotating auger may pull grain into this opening to be carried by the auger vanes upwardly of chute 81 and downwardly out of its nozzle 81a into the mouth E of the machine.

The present machine may be driven either by belt from a shaft or directly from the power take off of the vehicle carrying same. On some forms of trucks the power take off goes in one direction, and in others it goes in an opposite direction. The blower is made so that the power can be taken from either end of the fan shaft, as in Figure 5 all it is necessary to do is to locate the pulley 50a on either end of shaft 43. This makes the blower reversible so that if the power is taken from one side the fan will run in one direction, and the opposite is true when it is turned around.

It is desired, further, to fasten the blower to the floor of the truck by inserting bolts M (Fig. 3) through the flange at the top of the blower.

I do not mean to confine myself to the exact details of construction disclosed herein but will cover all parts set forth in the appended claims.

I claim:

1. A grain blower comprising a fan housing having vertical side walls, a horizontally disposed shaft rotatable within said housing at right angles to said side walls, radially extending fan blades secured to said shaft, a hopper disposed above said housing including a pair of downwardly convergent side walls forming a grain guiding passage on each side of said housing and fixed to said housing side walls below said shaft and adjacent to the vertical projection thereof, an opening formed in each of said housing side walls adapted to communicate said grain guiding passages with the interior of said housing for admitting grain into the latter, an air duct carried by each of said downwardly convergent side walls opening into said fan housing below said grain admitting openings, a common inlet mouth for said hopper, and a sliding valve carried by said inlet mouth.

2. A grain blower comprising a fan housing having vertical side walls, a horizontally disposed shaft rotatable within said housing at right angles to said side walls, radially extending fan blades secured to said shaft, a hopper disposed above said housing including a pair of downwardly convergent side walls forming a grain guiding passage on each side of said housing and fixed to said housing side walls below said shaft and adjacent to the vertical projection thereof, an opening formed in each of said housing side walls adapted to communicate said grain guiding passages with the interior of said housing for admitting grain into the latter, an air duct carried by each of said hopper side walls opening into said fan housing below said grain admitting openings, a common inlet mouth for said hopper, upwardly convergent baffle plates in said hopper for dividing the grain therein equally between said grain guiding passages on opposite sides of said fan housing, and a sliding valve carried by said mouth.

HALBERT C. WALLACE.

REFERENCES CITED

The following references are of record in the file of this patent:

UNITED STATES PATENTS

| Number | Name | Date |
|---|---|---|
| 1,289,756 | Hayward et al. | Dec. 31, 1918 |
| 1,535,363 | Wallace | Apr. 28, 1925 |
| 2,405,094 | Michael | July 30, 1946 |
| 2,411,490 | Williams | Nov. 19, 1946 |